(12) United States Patent
Wergin

(10) Patent No.: US 8,469,385 B2
(45) Date of Patent: Jun. 25, 2013

(54) ROTARY PIVOT HITCH EXTENSION SYSTEM

(75) Inventor: Mark Lee Wergin, Loveland, CO (US)

(73) Assignee: F & S Manufacturing LLC, Loveland, CO (US)

( * ) Notice: Subject to any disclaimer, the term of this patent is extended or adjusted under 35 U.S.C. 154(b) by 51 days.

(21) Appl. No.: 13/065,828

(22) Filed: Mar. 29, 2011

(65) Prior Publication Data

US 2011/0241311 A1   Oct. 6, 2011

Related U.S. Application Data

(60) Provisional application No. 61/341,634, filed on Apr. 2, 2010.

(51) Int. Cl.
*B60D 1/54* (2006.01)

(52) U.S. Cl.
USPC .............. 280/491.2; 280/479.1; 280/478.1; 280/482

(58) Field of Classification Search
USPC ................. 280/491.2, 479.1, 478.1, 482
See application file for complete search history.

(56) References Cited

U.S. PATENT DOCUMENTS

| 7,156,411 B2* | 1/2007 | Jaekel et al. | 280/495 |
| 7,497,458 B2* | 3/2009 | Daniel | 280/479.1 |
| 7,690,672 B2* | 4/2010 | Scruggs | 280/491.2 |
| 2007/0138760 A1* | 6/2007 | Granzow | 280/491.2 |
| 2010/0213687 A1* | 8/2010 | McDaniel et al. | 280/491.2 |

OTHER PUBLICATIONS

U.S. Appl. No. 61/341,634, filed Apr. 2, 2010.

* cited by examiner

*Primary Examiner* — Tashiana Adams
*Assistant Examiner* — Marlon Arce
(74) *Attorney, Agent, or Firm* — Craig R. Miles; CR Miles, P.C.

(57) ABSTRACT

Generally, a hitch having a retractably extendable member reciprocally driven by a rotatable member having a first end configured for coupling to a hitchable object.

22 Claims, 6 Drawing Sheets

ROTARY PIVOT HITCH EXTENSION SYSTEM

This United States Non-provisional patent application claims the benefit of U.S. Provisional Patent Application No. 61/341,634, filed Apr. 2, 2010, hereby incorporated by reference herein.

I. BACKGROUND

Generally, a hitch having a retractably extendable member reciprocally driven by a rotatable member having a first end configured for coupling to a hitchable object.

Conventional tow hitches may provide a frame which attaches to the chassis of a tow vehicle. A portion of the frame extends outwardly from the tow vehicle to terminate in a tow ball, a tow pin and jaw, or tow pintle, or the like (or terminates in a configuration capable of receiving a tow ball, tow pin and jaw, or tow pintle, or the like). The tow ball, tow pin and jaw, tow pintle, or the like correspondingly mates with the tongue of a towed vehicle, such as a trailer.

Typically, the portion of the frame which extends outwardly from tow vehicle has a fixed configuration which requires movement of the tow vehicle to establish the position of the tow ball, tow pin and jaw or tow pintle, or other matable hitch part in relation to the corresponding matable part of the hitch of the towed vehicle. Alignment of the matable parts of the hitch of towing vehicle and the tongue of the towed vehicle for mated securement requires precision movement of the tow vehicle.

II. SUMMARY OF THE INVENTION

Accordingly, a broad object of the invention can be to provide a hitch framework attachable to a hitch carrier, such as a tow vehicle, which provides a retractably extendable member which terminates in or can receive a tow ball, a tow pin, or a tow pintle, or other hitch element which can be extended and retracted with a sufficient amount of freedom of motion (whether lateral or vertical freedom) useful in the alignment of the matable hitch element with the corresponding matable tongue element of the towed vehicle.

Another broad object of the invention can be to provide a method of producing a hitch by providing the hitch framework including a pair of mounting members each configured to couple to a part of a hitch carrier (or towing vehicle), a cross member fixedly disposed between said pair of mounting members and an axle support member coupled in fixed relation to the cross member and positioning an axle in the axle support and rotationally coupling a rotatable member to the axle and by coupling a pivot element to the rotatable member, the pivot element can be driven in a circular path by rotation of said rotatable member about said axle and by pivotally coupling a retractably extendable member having a length disposed between a first end and a second end to the pivot element proximate the second end rotation of the rotatable member about the axle can generate reciprocal travel in the retractably extendable member in slidably engaged relation to said cross member between an extended condition and a retracted condition.

Another broad object of the invention can be to provide a method of operating a hitch by generating rotation in the rotatable member in a first direction about an axis of rotation and driving the pivot element coupled to the rotatable member in a circular path in the first direction thereby generating travel in the retractably extendable member having a second end coupled to the pivot element which extends the first end of the retractably extendable member outwardly a distance toward an extended condition for coupling the first end to a hitchable object. Similarly, by generating additional rotation in the rotatable member in a second direction (or continued rotation in the first direction past 180 degrees) about the axis of rotation and driving the pivot element coupled to the rotatable member in the circular path in a second direction (or in the same direction past 180 degrees) generates travel in the retractably extendable member having a second end coupled to the pivot element to retract the first end of the retractably extendable member inwardly a distance toward a retracted condition.

Naturally, further objects of the invention are disclosed throughout other areas of the specification, drawings, photographs, and claims.

III. A BRIEF DESCRIPTION OF THE DRAWINGS

IV. DETAILED DESCRIPTION OF THE PREFERRED EMBODIMENTS

Figure 1:
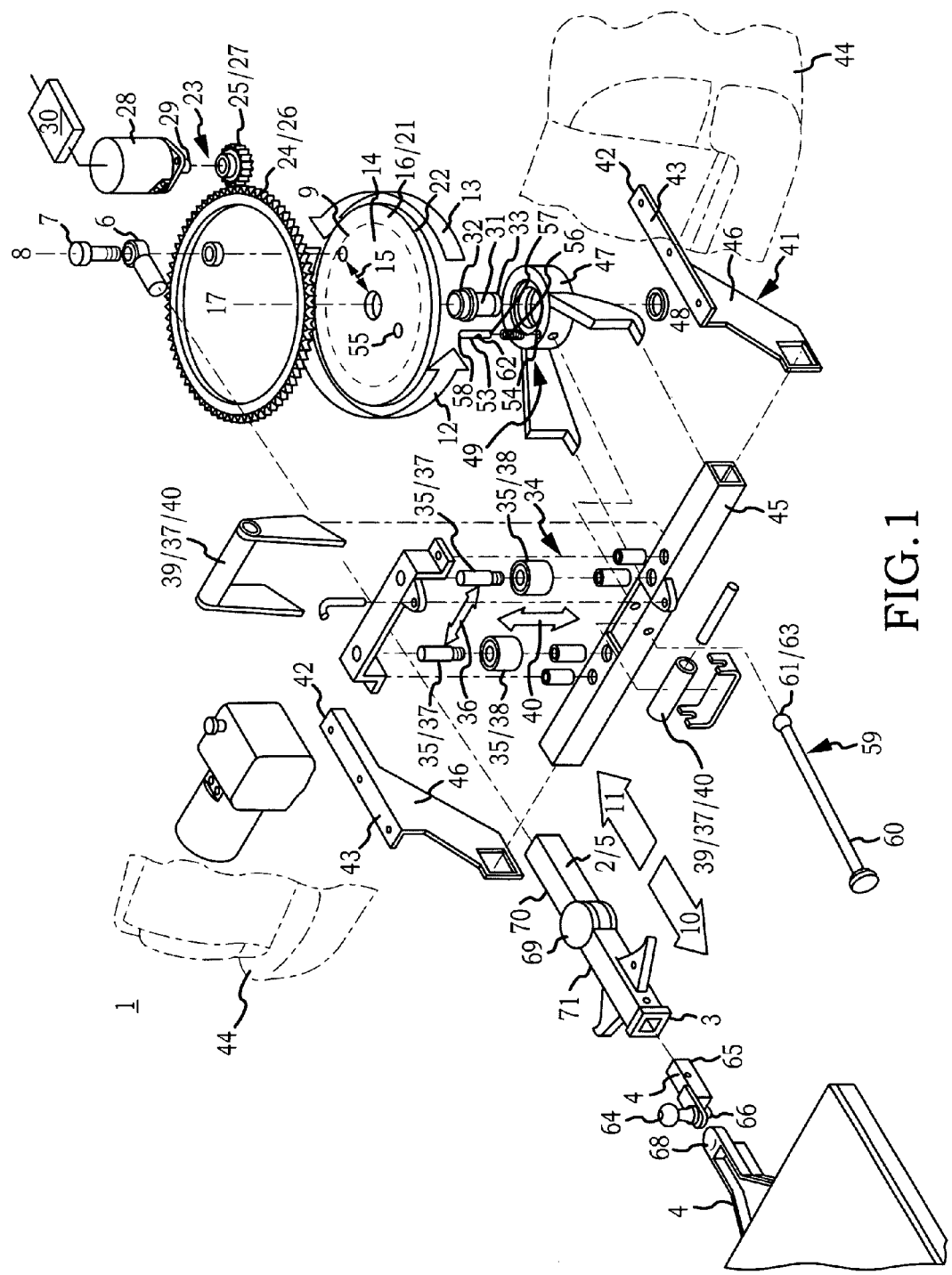
FIG. 1 is an exploded view of a particular embodiment of the inventive hitch.

Now referring primarily to FIGS. 1-6, embodiments of the inventive hitch system (1) can include a retractably extendable member (2). The retractably extendable member (2) can have length disposed between a first end (3) and a second end (6). The first end (3) can be configured as a hitch element (64) which couples to a hitchable object (4). As non-limiting examples, the first end (3) can be configured to provide a hitch element (64) as a tow ball, tow pin and jaw, tow pintle, or the like, which can matingly engage with a matable portion (68) of a hitchable object (4); however, the invention is not limited to these conventional examples, and the first end (3) of the retractably extendable member (2) can be configured in any manner which allows the first end (3) to mate directly or indirectly to any one or more of a wide variety of hitchable objects (4) and without limitation to the forgoing general description, the matable portion (68) of a hitchable object (4) can take the form of a tongue of trailer, or a tongue coupled to a towed vehicle (such as a car, wagon, barrow, boat, or the like); or the first end (3) can be configured to mate with equipment, such as a post hole digger, fence post puller, or the like; or can be configured to support or receive a luggage carrier, a platform, an umbrella, or other objects.

Now referring primarily to FIG. 1, the first end (3) of the retractably extendable member (2) can be configured as a hollow conduit (5) substantially square in cross section (although other cross sectional configurations can be utilized such oval, round, triangle, rectangle, or the like). As to certain embodiments, the matable portion (68) of a hitchable object (4) of substantially square cross section (or other cross sectional configurations) can be mated with the first end (3) by removable insertion in the hollow conduit (5) of the first end (3) of the retractably extendable member (2). Alternatively, the hitch element (64) can be configured as any of a plurality of interchangeable hitch elements (64) each having a first hitch element end (65) configured to insertingly engage the hollow conduit (5) and a second hitch element end (66) configured as tow ball, tow pin and jaw, tow pintle, or other configuration matable with the hitchable object (4). While FIG. 1 shows the second hitch element end (66) configured as a tow ball; the invention is not so limited.

Particular embodiments of the retractably extendable member (2) can further include an articulating element (69) which unites the first portion (70) of the retractably extendable member (2) proximate the pivot element (7) and the second portion (71) of the retractably extendable member (2) proximate the hitch element (64) at a joint which allows lateral movement of the first portion (70) in relation to the second portion (71).

Again referring to FIGS. 1-6, the retractably extendable member (2) can have a second end (6) which couples to an assembly capable of retractable extension of the retractably extendable member (2). Particular non-limiting embodiments of the second end (6) of the retractably extendable member (2) can be configured to rotate about a pivot element (7). As the pivot axis (8) of the pivot element (7) travels, the first end (3) of the retractably extendable member (2) correspondingly travels in response. If the pivot axis (8) travels in a generally circular path (9), the first end (3) of the retractably extendable member (2) can be driven in a first direction (10) in a first 180 degrees of travel (12) in the circular path (9) to the extended condition (67) (see FIG. 3 broken line) and driven in a second direction (11) (opposite direction) in the second 180 degrees of travel (13) in the circular path (9) to the retracted condition (52) (see FIG. 3 solid line).

Understandably, the circular path (9) can be about any circular area (14) having a radius (15) of sufficient length to generate the desired distance and direction of travel (10) (11) in the first end (3) of the retractably extendable member (2). One non-limiting method of generating travel in the pivot element (7) can be to couple the pivot element (7) to a rotatable member (16). The rotatable member (16) can have an axis of rotation (17) and the pivot element (7) can be coupled to the rotatable member (16) at sufficient distance from the axis of rotation (17) to generate a circular path (9) having radius (15) sufficient to generate the desired amount of travel in the first end (3) of the retractably extendable member (2).

Figure 2:
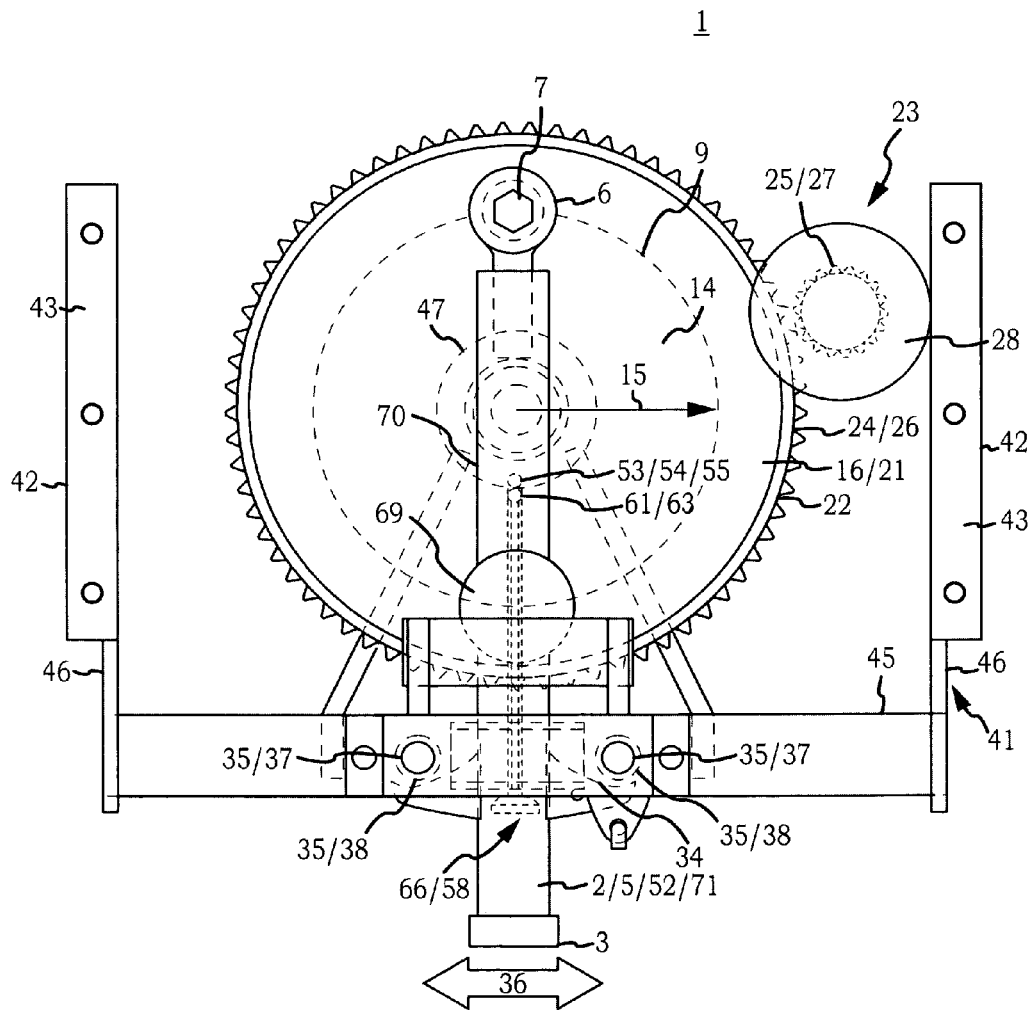
FIG. 2 is a plan view of the particular embodiment of the inventive hitch shown in FIG. 1.
Figure 3:
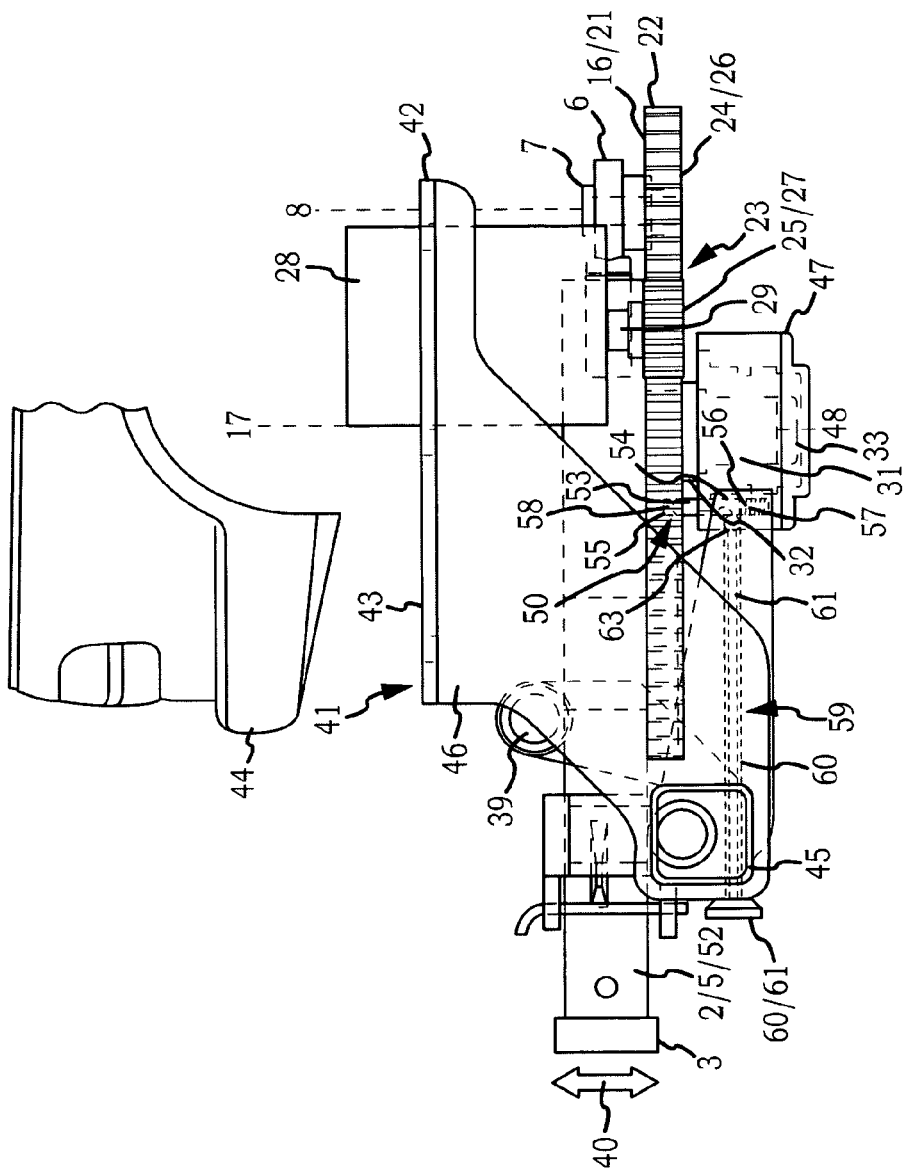
FIG. 3 is a side view of the particular embodiment of the inventive hitch shown in FIG. 1.
Figure 4:
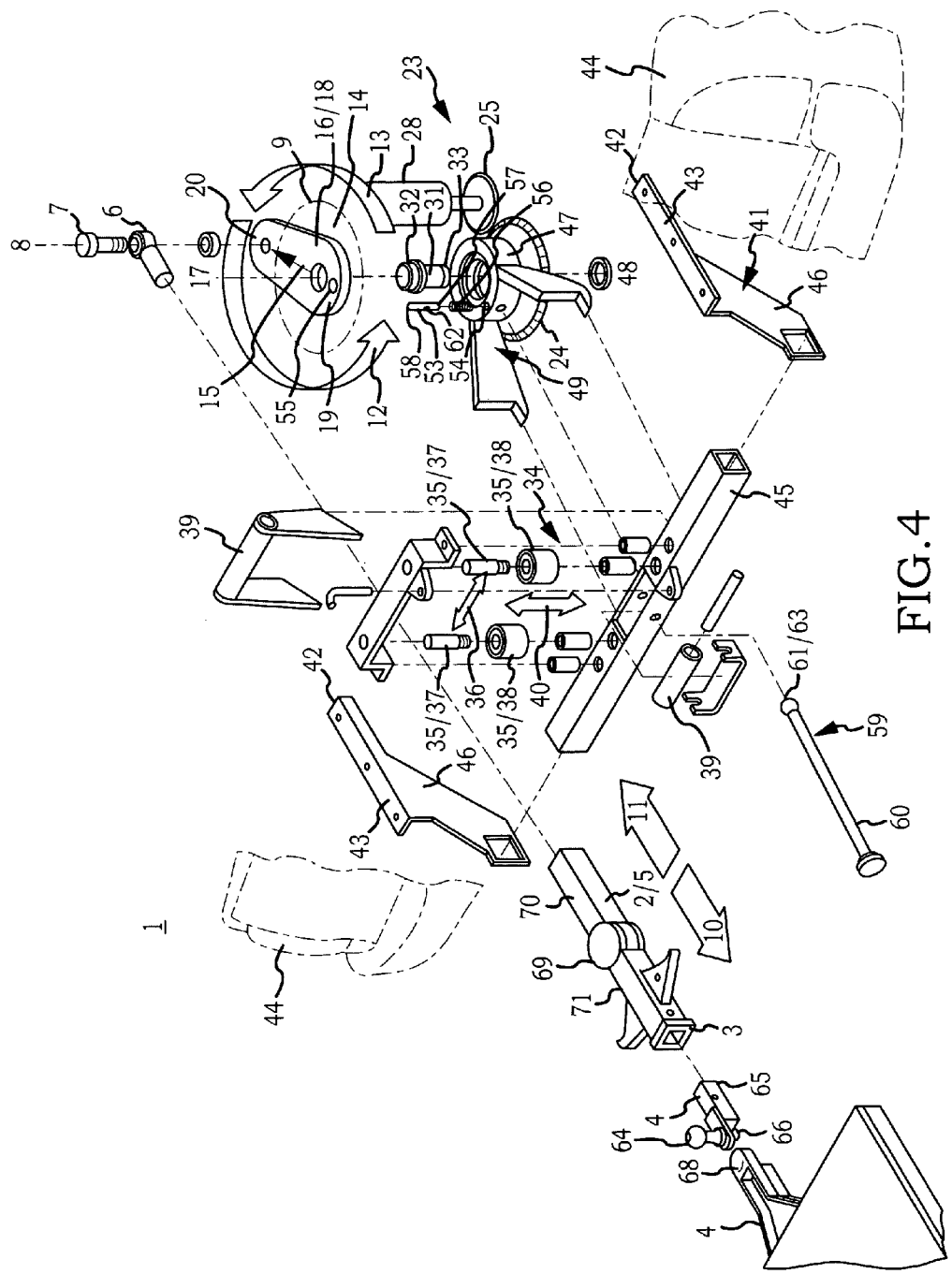
FIG. 4 is an exploded view of a second particular embodiment of the inventive hitch.
Figure 5:
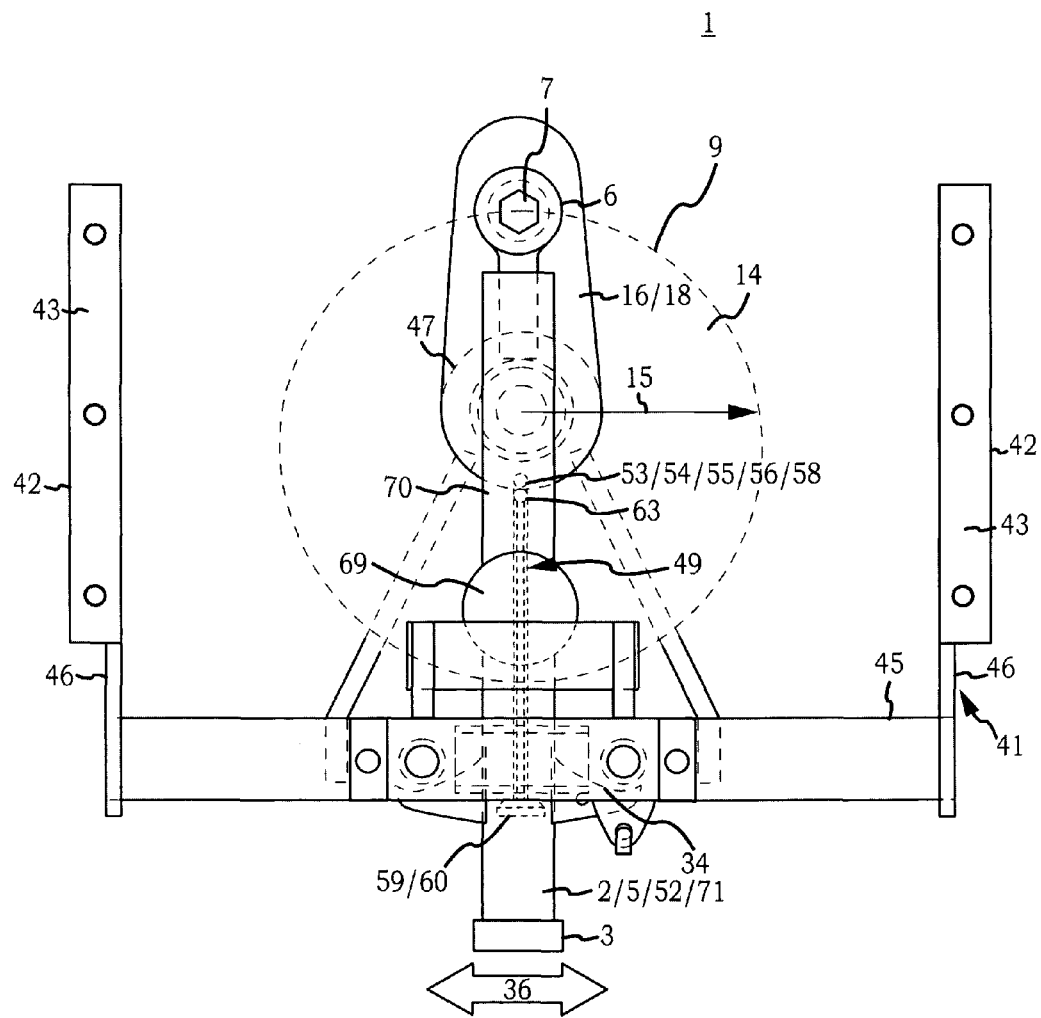
FIG. 5 is a plan view of the particular embodiment of the inventive hitch shown in FIG. 4.
Figure 6:
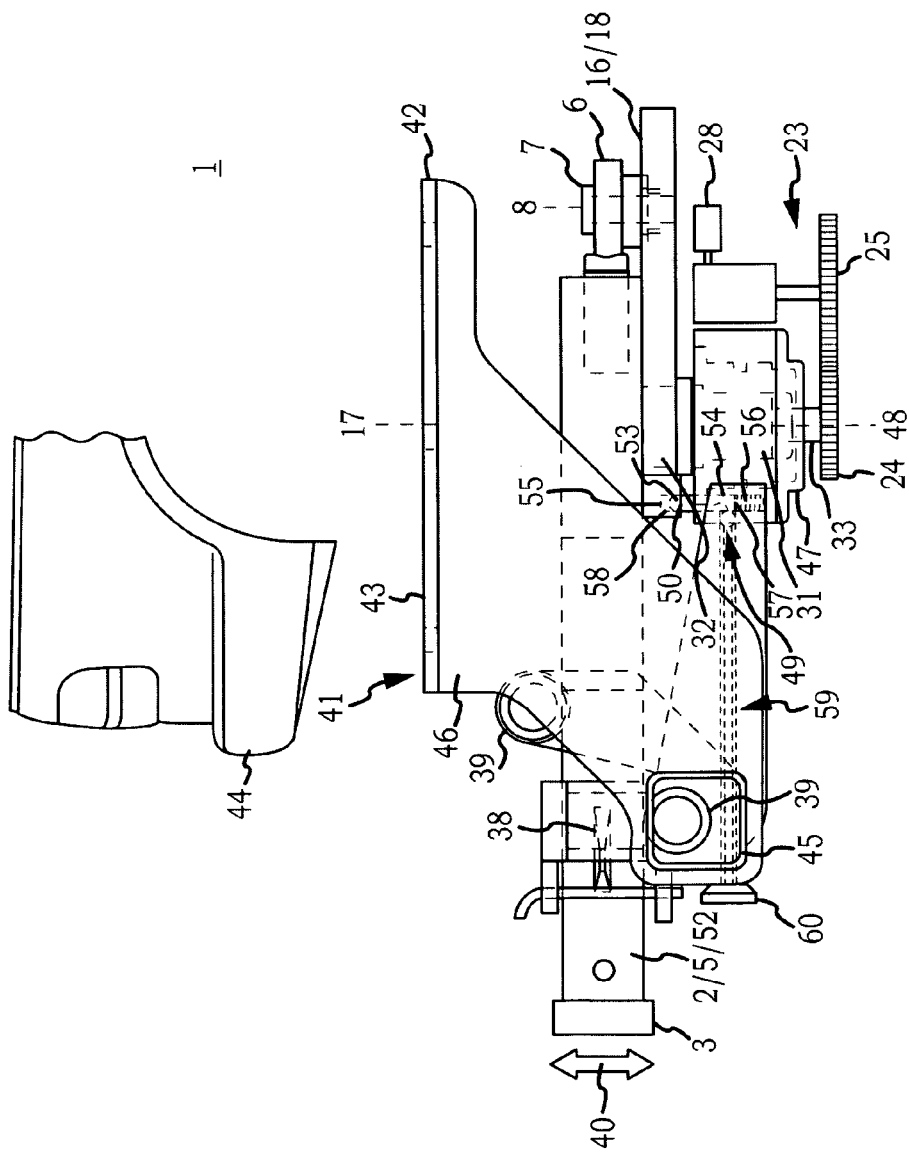
FIG. 6 is a side view of the particular embodiment of the inventive hitch shown in FIG. 5.

As shown in FIGS. 1-3, particular embodiments of the rotatable member can be configured as a circular disk (21) having the axis of rotation (17) located generally on center and the pivot axis (8) proximate the circumference (22). As shown in FIGS. 4-6, the rotatable member (16) can be configured as an elongate member (18) having the axis of rotation (17) coupled proximate a first end (19) and the pivot element (7) coupled proximate the second end (20). Any configuration of the rotatable member (16) can be used capable of being rotated about the axis of rotation (17) and to which the pivot element (7) can be made responsive to travel in a pattern (not necessarily circular) which generates a useful amount of directional travel (10) (11) in the first end (3) of the retractably extendable member (2).

Embodiments of the inventive hitch system (1) can further include a drive assembly (23) which operates to generate rotation of the rotatable member (16) about the axis of rotation (17). As shown in FIGS. 1-3, the drive assembly (23) can include a driven element (24) made responsive to a drive element (25). Operation of the drive element (25) urges the driven element (24) to generate rotation in the rotatable member (16) about the axis of rotation (17). As shown in FIGS. 1-3, a non-limiting example of the driven element (24) as shown in FIGS. 1-3 is a toothed sprocket (26) coupled to or integral to the circular disk (21) and the drive element (25) can be a toothed gear (27) matable with the toothed sprocket (26); however, the invention is not so limited, and the circular disk (21) can provide a groove that can be mated to a belt driven by a drive pulley, or can provide a toothed sprocket mated to a chain driven by a drive sprocket, or the like. The drive assembly (23) can further include a driver (28) having a rotatable shaft (29) (such as an electric motor) configured to couple to the drive element (25). Operation of the driver (28) generates corresponding rotation of the drive element (25) which directly by frictional engagement, mated teeth, or the like, or indirectly by belt, chain or the like, generates rotation of the driven element (24) to which the rotatable member (16) responds by rotation about the axis of rotation (17). The above examples of a driver (28) are not intended to preclude use of a rotatable shaft (29) responsive to a gearbox or transmission manually driven with a crank or handle. As to certain embodiments of the invention, the drive assembly (23) can further include a gearbox or a controller (30) coupled to the driver (28) which allows the rotational speed and direction of the rotatable shaft (29) to be set or adjusted to correspondingly set or adjust the travel rate and direction of the a retractably extendable member (2).

Now referring primarily to FIGS. 4-6, the drive assembly (23) can include an axle (31) having a first end (32) coupled to the rotatable member (16) and a second end (33) coupled to a driven element (24). The drive element (25) can be directly or indirectly coupled as above-described to a driver (28) which upon operation generates rotation in the axle (31) and corresponding rotation of the rotatable member (16) which allows the retractably extendable member (2) to be driven in a first direction (10) and a second direction (11) to correspondingly extend and retract the retractably extendable member (2).

Now referring to FIGS. 1-6, embodiments of the invention can further include a guide assembly (34) which limits travel of the a retractably extendable member (2) laterally and vertically within a fixed range. As shown in FIG. 2, as an example, the guide assembly (34) can at least provide a first pair of guide elements (35) between which the retractably extendable member (2) passes. The first pair of guide elements (35) can limit lateral movement (side to side or sideways movement) of the retractably extendable member (2). The distance between the first pair of guide elements (35) can be greater or lesser to provide a correspondingly greater or lesser range of lateral movement (36) in the retractably extendable member (2) in accordance with the utilization. Sufficient lateral movement (36) of the retractably extendable member (2) between the first pair of guide elements (35) allows the first end (3) of the retractably extendable member (2) to be coupled to a hitchable object (4) located within the range of lateral movement (36) provided by the first pair of guide elements (35).

While certain embodiments of the first pair of guide elements (35) can take the form of guide pins (37) having a stationary surface which can engage the external surface of the retractably extendable member (2) to prevent further lateral movement (36); the invention is not so limited, and other embodiments of the first pair of guide elements (35) as shown in the Figures can take the form of a first pair of roller elements (38) which can rotate upon engagement with the retractably extendable member (2). The amount of lateral movement afforded by the first pair of guide elements (35) can for example be between about ten degrees and about 30 degrees rotation about the pivot axis (8) when in the retracted condition (52); however, the invention is not so limited and a greater or lesser amount of lateral movement (36) can be afforded the retractably extendable member (2). Understandably, for any given distance between the first pair of guide pins (35) the range of lateral movement (36) afforded the retractably extendable member (2) will be greater in the extended condition (67) as compared to the retracted condition (52).

Similarly, the guide assembly (34) can further provide a second pair of guide elements (39) between which the retractably extendable member (2) passes. As shown in FIG. 3 for example, the second pair of guide elements (39) can limit vertical movement (40) (up or down movement) of the retractably extendable member (2). The distance between the second pair of guide elements (39) can be greater or lesser to provide a correspondingly greater or lesser range of vertical movement (40) in the retractably extendable member (2) in accordance with the utilization. Sufficient vertical movement (40) of the retractably extendable member (2) between the second pair of guide elements (39) allows the first end (3) of the retractably extendable member (2) to be coupled to a hitchable object (4) located within the range of vertical movement (40) provided by the second pair of guide elements (39). While certain embodiments of the second pair of guide elements (39) can take the form of guide pins (37) having a stationary surface which engages the external surface of the retractably extendable member (2) to prevent further vertical movement (40); the invention is not so limited, and other embodiments as shown in the Figures can take the form of second pair of roller elements (39) which can rotate upon engagement with the external surface of the retractably extendable member (2). The amount of vertical movement (40) afforded by the second pair of guide elements (35) can for example be between about five degrees and about 10 degrees rotation about the pivot axis (8) when in the retracted condition (52); however, the invention is not so limited and a greater or lesser amount of vertical movement (40) can be afforded the retractably extendable member (2). Understandably, for any given distance between the second pair of guide pins (35) the range of vertical movement (36) afforded the retractably extendable member (2) will be greater in the extended condition (67) as compared to the retracted condition (52).

Again referring to FIGS. 1-6, embodiments of the invention can further provide a hitch framework (41) configured to locate the above-described assemblies and elements of the inventive hitch system (1) in operable relation to one another and further configured to provide one more a mount members (42) configured to provide a surface (43) for fixed engagement of the hitch (1) with a hitch carrier (44). A hitch carrier (44) can be any manner of object to which the hitch can be usefully coupled such as a car, a truck, a tractor, a trailer, or the like.

As one non-limiting example, the hitch framework (41) can provide a cross member (45) having a length disposed between a pair of mounting members (46) which extend upwardly a distance above the cross member (45) to terminate in the mount elements (42). The mount elements (42) can be located a sufficient distance above the cross member (45) to allow fixed engagement of the surface of the mount elements (42) with a corresponding surface of the hitch carrier (44) allowing operation of the retractably extendable member (3) as above-described with the hitch system (1) coupled to the hitch carrier (44).

The first pair of guide elements (35) can be fixedly secured to the central portion of the cross member (45) between the mounting members (46). Typically, the first pair of guide elements (35) will be located a sufficient distance apart to allow the retractably extendable member (2) to pass between at a location proximate the middle of the cross member (45). The second pair of guide elements can be coupled in fixed relation to the cross member (45) and the first pair of guide elements (35) such that the rectractably extendable member (2) when positioned at any location between the first pair of guide elements (35) to limit lateral movement (36) will also be located between the second pair of guide elements (39) to limit vertical movement (40) of the retractably extendable member (2).

The hitch framework (41) can further include an axle support member (47) in which the axle (31) can be fixedly or rotatably journaled. The axle support member (47) can be configured to connect to the cross member (45) to locate the longitudinal axis (48) of the axle (31) coincident with the axis of rotation (17) of the rotatable member (16).

Now referring primarily to FIGS. 3 and 6, particular embodiments of the inventive hitch (1) can further include a lock assembly (49) which can be operated between a locked condition (50) (as shown in each of FIGS. 3 and 6) and an unlocked condition (51). The locked condition (50) interrupts rotation or locks rotation of the rotatable member (16) at a particular position which in turn fixes the location of the first end (3) of the rectractably extendable member (2). For example, the rotatable member (16) can be rotated to achieve the retracted condition (52) (as shown in FIGS. 2 and 5) of the retractably extendable member (2) and by operation of the lock assembly (49) from the unlocked condition (51) to the locked condition (50), the locked condition (52) of the retractably extendable member (2) maintains the retractably extendable member (2) in the retracted condition (52).

One particular embodiment of the lock assembly (49) includes a lock member (53) of cylindrical configuration slidely received by a corresponding lock member bore (54) of a corresponding cylindrical configuration. The lock member bore (54) can be generated in the axle support member (47) in generally perpendicular relation to the rotatable member (16). A lock aperture (55) can communicate between the opposed sides of the rotatable member (16) at a location rotatably alignable with the lock member bore (54) of the axle support member (47). A spring element (56) can be located in the lock member bore (54). The lock member (53) can be slidely received by the lock member bore (54) to engage a first end (57) of the lock member (53) with the spring element (56). The spring element (56) can engage the lock member (53) to forcibly urge the second end (58) of the lock member (53) against the rotatable member (16). Upon rotatable alignment of the lock aperture (55) with the lock member bore (54), the second end (58) of the lock member (53) can be received in the lock member aperture (55) to interrupt rotation of the rotatable member (16) and fix the location of the retractably extendable member (2).

Understandably, this example is not intended to limit the invention to this particular lock assembly (49). For example, the lock member (53) and lock aperture (55) or similar elements can be located differently and remain in operable relation within the hitch system (1). As one additional example, if the axle (31) rotates within the axle support member (47), the lock bore (54) could extend radially outward from the axis of rotation (48) of the axle (31) to communicate with the surface of the axle (31) and the lock member (53) can be slidingly received by the lock bore (54) to interrupt rotation of the rotatable member (16).

The lock assembly (49) can further include a lock release assembly (59) which can operate to sufficiently forcibly urge the lock member (53) against the spring element (56) to allow the lock member (53) to disengage from the lock aperture (55) of the rotatable member (16). As one embodiment of the lock release assembly (59), a lock release member (60) has a first end (61) which engages the external surface of the lock member (53). The lock member (53) can provide a recess element (62) which can receive a portion of the first end (61) of the release member (60). The recess element (62) can have a location in sufficiently close relation to the first end (61) of the release member (60), such that forcible urging of the release member (60) toward the lock member (53) can induce sufficient travel in the lock member (53) to allow the first end (61) of the lock release member (60) to be insertingly received by the recess element (62) to establish the lock assembly (49) in the unlocked condition (51). The first end (61) of the lock release member (60) can provide a curved configuration or in particular non-limiting embodiments a roller ball (63) which can assist in generating travel in the lock member (53) upon forcible urging of the first end (61) of the lock release member (60) against the external surface of the lock member (53). Travel of the first end (61) of the lock release member (60) away from the lock member (53) removes the first end (60) from the recess element (61) allowing the second end (58) of the lock member (53) to be received by the lock aperture (55) upon alignment of the lock aperture (55) with the lock member bore (54).

The particular non-limiting embodiments of the inventive hitch (1) shown in the Figures and above described can be utilized by coupling the mount elements (42) to the surface (43) of a hitch carrier (44). Typically, the hitch (1) mounted to the hitch carrier (44) fixes the retractably extendable member (2) at a location which allows coupling of the first end (3) or the hitch element (64) of the retractably extendable member (3) to the matable portion (68) of a hitchable object (4). The hitchable object (4) can be established at a location a distance from the first end (3) of the retractably extendable member (2). The first end (61) of the lock release member (60) of the lock assembly (49) can be forcibly urged against the lock member (53) as above-described to establish the lock assembly (49) in the unlocked condition (51). The rotatable member (16) can be rotated in a first 180 degrees of travel (12), whether manually or by the drive assembly (23), to extend the first end (3) of the retractably extendable member (2) toward or to the extended condition (67) into hitchable relation with the hitchable object (4) (the hitch element (64) movable within the range of lateral movement (36) and vertical movement (40) can be mated with the corresponding a matable portion (68) of a hitchable object (4)).

The first end (3) of the hitch element (64) of the retractably extendable member (2) can be hitched to the matable portion (68) of the hitchable object (4). The rotatable member (16) can be rotated in the second 180 degrees of travel (13) in the same rotational direction (in the opposite direction of rotation) to retract the retractably extendable member (16) hitched to the matable portion (68) of the hitchable object (4). The first end (61) of the lock release member (60) of the lock assembly (49) can be disengaged from the lock member (53) to allow the lock member (53) to be established in the locked condition (50).

As can be easily understood from the foregoing, the basic concepts of the present invention may be embodied in a variety of ways. The invention involves numerous and varied embodiments of an inventive hitch (1) having retractably extendable member and methods of making and using such hitch.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "hitch" should be understood to encompass disclosure of the act of "hitching"—whether explicitly discussed or not—and, conversely, were there effectively disclosure of the act of "hitching", such a disclosure should be understood to encompass disclosure of "a hitch" and even a "means for hitching". Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

For the purposes of the present invention, ranges may be expressed herein as from "about" one particular value to "about" another particular value. When such a range is expressed, another embodiment includes from the one particular value to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. In the absence of any express written value, "about" means within +/−10 percent of the numerical value indicated.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the hitches herein disclosed and described herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A hitch, comprising:
   a) a rotatable member which rotates about an axis of rotation;
   b) a pivot element connected to said rotatable member, said pivot element having a pivot axis driven in a circular path about said axis of rotation by rotation of said rotatable member;
   c) a retractably extendable member disposed between a first end and a second end, said second end rotatably coupled to said pivot element allowing rotation of said retractably extendable member about said pivot axis, whereby rotation of said rotatable member about said axis of rotation generates reciprocal travel in said retractably extendable member, said first end configured to provide or receive a hitch element which couples to a hitchable object; and
   d) a hitch framework configured to mount to the surface of a hitch carrier, said framework further configured to locate said rotatable member, said pivot element and said retractably extendable member in operable relation, whereby rotation of said rotatable member about said axis of rotation generates extension and retraction of said first end of said retractably extendable member.

2. The hitch as described in claim 1, wherein said rotatable member comprises a circular disk having said axis of rotation located generally on center and said pivot element coupled a distance radially outward of said axis of rotation.

3. The hitch as described in claim 2, wherein said circular path of said pivot has a radius and wherein said retractably extendable member has a length each of said radius and said length sufficient to extend said first end of said retractably extendable member a distance outward of said framework sufficient to couple said first end to a hitchable object.

4. The hitch as described in claim 1, wherein said hitch element is selected from the group consisting of: a hitch ball, a tow ball, a tow pin and jaw, and a tow pintle.

5. The hitch as described in claim 1, wherein said hitch carrier is selected from the group consisting of: a vehicle, a car, a truck, and a tractor.

6. The hitch as described in claim 1, wherein said hitchable object is selected from the group of: a vehicle, a trailer, a barrow, and a boat.

7. The hitch as described in claim 1, wherein said framework includes a pair of mounting members coupled at opposed ends of a cross member, said pair of mounting members each configured to couple to a part of said hitch carrier to dispose said cross member in fixed relation to said hitch carrier.

8. The hitch as described in claim 7, wherein said framework further includes an axle support member coupled to said cross member, an axle fixedly or rotatably journaled in said axle support about which said rotatable member rotates about said axis of rotation.

9. The hitch as described in claim 8, further comprising a first pair of guide elements coupled to said cross member between which said retractably extendable member reciprocally travels, said first pair of guide elements restricting lateral movement of said retractably extendable member.

10. The hitch as described in claim 9, further a second pair of guide elements disposed in fixed relation to said cross member between which said retractably extendable member reciprocally travels, said second pair of guide elements restricting vertical movement of said retractably extendable member.

11. The hitch as described in claim 10, wherein at least one of said first pair of guide elements comprises a roller element.

12. The hitch as described in claim 10, wherein at least one of said second pair of guide elements comprises a roller element.

13. The hitch as described in claim 2, further comprising a drive assembly coupled to said rotatable member, said drive assembly comprising a driven element coupled to said rotatable member and a drive element engaged to said driven element which drives said pivot in a first direction in said circular path and in a second direction in said circular path to correspondingly extend and retract said retractably extendable member.

14. The hitch as described in claim 13, wherein said driven element comprises a toothed sprocket and said drive element comprises a toothed gear.

15. The hitch as described in claim 14, further comprising a driver which drives said toothed gear.

16. The hitch as described in claim 15, further comprising a controller coupled to said driver which operates to control said first direction and said second direction in which said pivot element travels in said circular path.

17. A method of operating a hitch, comprising the steps of:
   a) generating rotation in a rotatable member in a first direction about an axis of rotation;
   b) driving a pivot axis of a pivot element connected to said rotatable member in a circular path about said axis of rotation in said first direction by rotation of said rotatable member; and
   c) generating travel in an retractably extendable member having a second end rotatably coupled to said pivot element by driving said pivot axis of said pivot element in said circular path about said axis of rotation in said first direction to extend a first end of said retractably extendable member outwardly a distance toward a hitch position for coupling to a hitchable object.

18. The method of operating a hitch as described in claim 17, further comprising the steps of:
a) generating rotation in a rotatable member in a second direction about said axis of rotation;
b) driving said pivot element coupled to said rotatable member in a circular path in said second direction by rotation of said rotatable member; and
c) generating travel in said retractably extendable member having said second end coupled to said pivot element by driving said pivot element in said circular path in said second direction to retract said first end of said retractably extendable member inwardly a distance toward a retracted condition.

19. The method of operating a hitch as described in claim 18, further comprising the step of operating a drive assembly which generates rotation in a rotatable member in a first direction about an axis of rotation.

20. The method of operating a hitch as described in claim 19, further comprising the step of controlling a drive element engaged with a driven element coupled to said rotatable member to generate rotation in said rotatable member in said first direction or said second direction.

21. The method of operating a hitch as described in claim 20, wherein said step of controlling a drive element engaged with a driven element coupled to said rotatable member comprises controlling an electric motor having shaft which rotates a toothed gear matable with a toothed sprocket coupled to said rotatable member to generate rotation in said rotatable member in said first direction or said second direction.

22. The method of operating a hitch as described in claim 21, further comprising the step of operating a lock assembly which fixes position of said rotatable element to maintain said first end of said retractably extendable member in said extended condition or in said retracted condition.

* * * * *